US011190454B2

(12) United States Patent
Thottethodi et al.

(10) Patent No.: US 11,190,454 B2
(45) Date of Patent: Nov. 30, 2021

(54) RECEIVER-DIRECTED COMPUTER NETWORK CONGESTION CONTROL SYSTEM

(71) Applicant: Purdue Research Foundation, West Lafayette, IN (US)

(72) Inventors: Mithuna Shamabhat Thottethodi, West Lafayette, IN (US); Terani N. Vijaykumar, West Lafayette, IN (US); Balajee Vamanan, West Lafayette, IN (US); Jiachen Xue, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/092,890

(22) PCT Filed: Mar. 23, 2017

(86) PCT No.: PCT/US2017/023910
§ 371 (c)(1),
(2) Date: Oct. 11, 2018

(87) PCT Pub. No.: WO2017/165711
PCT Pub. Date: Sep. 28, 2017

(65) Prior Publication Data
US 2019/0140962 A1    May 9, 2019

Related U.S. Application Data

(60) Provisional application No. 62/312,097, filed on Mar. 23, 2016.

(51) Int. Cl.
G06F 15/173 (2006.01)
H04L 12/859 (2013.01)
(Continued)

(52) U.S. Cl.
CPC .... H04L 47/2475 (2013.01); G06F 15/17306 (2013.01); H04L 12/185 (2013.01);
(Continued)

(58) Field of Classification Search
CPC .................................................. H04L 47/2475
(Continued)

(56) References Cited

U.S. PATENT DOCUMENTS 9,455,927 B1 * 9/2016 Nayak ................. H04L 47/2416
2009/0319701 A1 * 12/2009 Mehrotra ............ H04L 67/1097
710/29

(Continued)

OTHER PUBLICATIONS

"Sharing Bandwidth by Allocating Switch Buffer in Data Center Networks" by Zhang et al., pp. 40-49; May 25, 2017.*
(Continued)

*Primary Examiner* — Hee Soo Kim
(74) *Attorney, Agent, or Firm* — Purdue Research Foundation (57) ABSTRACT

A receiver-directed congestion control system which provides receiver-directed apportioning by adding a bandwidth share indicator value to the acknowledgement messages sent by the receiver to the senders. In certain embodiments, bandwidth share indicator value comprises the number of senders seen by the receiver. In other embodiments, the bandwidth share indicator value may comprise a percentage bandwidth share allocated to the sender computer to allow for varying priorities between senders. In the acknowledgement message, each sender may also include the incast degree, which is programmed in the application, to the receiver. This strategy enables the receiver to send back the sender count to all the senders as soon the first sender's packets arrive, even before the rest of the senders' packets arrive. Thus, the sender count and the incast degree look-
(Continued)

ahead enable the receiver-directed system to achieve accurate and faster convergence of sending rates, without any repeated adjustments.

24 Claims, 6 Drawing Sheets

(51) Int. Cl.
   *H04L 12/18* (2006.01)
   *H04L 12/841* (2013.01)
   *H04L 29/08* (2006.01)
   *G06F 15/16* (2006.01)

(52) U.S. Cl.
   CPC ........ *H04L 12/1886* (2013.01); *H04L 47/283* (2013.01); *H04L 67/1097* (2013.01)

(58) Field of Classification Search
   USPC .................. 709/206, 223, 226, 232–234
   See application file for complete search history.

(56) References Cited

U.S. PATENT DOCUMENTS

| | | | |
|---|---|---|---|
| 2010/0183024 A1* | 7/2010 | Gupta | H04L 67/1097 370/463 |
| 2012/0054362 A1* | 3/2012 | Tsao | H04L 12/66 709/232 |
| 2012/0140621 A1 | 6/2012 | Wu et al. | |
| 2013/0007180 A1* | 1/2013 | Talpey | H04L 47/39 709/212 |

OTHER PUBLICATIONS

Mittal et al., Revisiting Network Support for RDMA, Jun. 21, 2018, https://arxiv.org/abs/1806.08159 (Year: 2018).*

Baydal, Elvira, et al., A Family of Mechanisms for Congestion Control in Wormhole Networks. IEEE Transactions on Parallel and Distributed Systems, 16(9):772-784, Sep. 2005.

Thottethodi, Mithuna et al., Self-Tuned Congestion Control for Multiprocessor Networks. In International Symposium on High-Performance Computer Architecture, © 2001 IEEE: 107-118.

Clos, Charles, Charles, A Study of Non-Blocking Switching Networks. Bell System Technical Journal, Mar. 1953, 32(2): 406-424.

Internet Engineering Task Force RFC 5681, © 2009 IETF; pp. 1-18.

International Search Report and Written Opinion for International PCT Application No. PCT/US2017/023910, issued by the ISA/US, Commissioner for Patents, dated Jun. 16, 2017; 8 pages.

International Preliminary Report on Patentability for International PCT Application No. PCT/US2017/023910, issued by The International Bureau of WIPO, Geneva, Switzerland, dated Sep. 25, 2018; 8 pages.

Zhang, Jiao, et al. "Sharing bandwidth by allocating switch buffer in data center networks." IEEE Journal on Selected Areas in Communications; 32.1 (2014): 39-51.

Al-Fares, Mohammad, et al., "NetBump: user-extensible active que management with bumps on the wire." Proceedings of the Eighth ACM/IEEE Symposium on Architectures for Networking and CommunicationsSystems. ACM, 2012; 12 pages.

\* cited by examiner

RECEIVER-DIRECTED COMPUTER NETWORK CONGESTION CONTROL SYSTEM

CROSS-REFERENCE TO RELATED APPLICATIONS

The present U.S. patent application is a 35 U.S.C. § 371 national phase application of PCT/US17/23910, filed Mar. 23, 2017, which is related to and claims the priority benefit of U.S. Provisional Patent Application Ser. No. 62/312,097, filed Mar. 23, 2016, the contents of which are hereby incorporated by reference in their entirety into the present disclosure.

TECHNICAL FIELD

The present application relates to computer network systems, and more specifically, to a computer network congestion control system.

BACKGROUND

Data center network performance is critical for most modern web/cloud services whose backends run within data centers. Many interactive datacenter applications have tight latency requirements due to stringent service-level agreements which directly impact revenue (e.g., under 200 ms for Web Search). Datacenter network latency is a major component of the application latency. While the networks have employed TCP, Remote Direct Memory Access (RDMA) is known to reduce latencies significantly compared to TCP by bypassing the operating system via hardware support at the network interface (e.g., RDMA over Infiniband and RDMA over Converged Ethernet (RoCE) can cut TCP's latency by 10×). As such, RDMA has been proposed as a faster replacement for TCP in datacenter applications.

Employing RDMA in datacenters, however, poses two challenges. First, RDMA provides hop-by-hop flow control but not end-to-end congestion control. While such flow control results in a lossless network, any congestion causes the well-known tree saturation problem where congestion at a switch spreads upstream in a tree rooted at the congested switch. This upstream spreading occurs due to the backpressure exerted by flow control where a sender is blocked because of a blocked receiver and so on. Tree saturation blocks even unrelated flows and results in a precipitous drop in the network throughput. While this problem is well-known in multiprocessor interconnection networks, those solutions are not applicable to data centers because they (a) do not offer end-to-end congestion control, (b) rely on observing the state of the entire network whose scale is much smaller than that of datacenter networks, and (c) employ common, network-wide throttling as response whereas datacenters need per-flow response to maintain high throughput.

The second issue is the incast problem, where multiple flows collide at a switch causing queuing delays and long latency tails. While good network design and load balancing avoid persistent congestion, sporadic congestion is inevitable in real deployments. While such occasional congestion affects only a small fraction of the flows (e.g., 0.1%), datacenter applications' unique characteristics imply that this infrequent problem affecting only the tail of the latency distribution worsens the average case. Because the applications often aggregate replies from many nodes for each query, waiting for the slowest reply worsens overall response latency and, alternately, dropping the reply worsens response quality (e.g., because WebSearch aggregates replies from 1000 nodes, the 99.9th percentile reply latency affects the overall average response time). This problem exists in TCP where incast causes packet drops and retransmissions which result in delays. While RDMA is lossless and hence does not incut packet drops and retransmissions, incast-induced queuing delays still affect RDMA's latency tail.

Recent work in RDMA-based datacenter networks target these two problems. For example, Datacenter QCN (DCQCN) proposes congestion control for RDMA. DCQCN relies on Early Congestion Notification (ECN) marks to detect the onset of congestion. Another work, called TIMELY, targets latency tail in RDMA and uses round-trip times (RTT) measurements, instead of ECN marks, as an indication of imminent congestion. Both DCQCN and TIMELY retain TCP's approach of constantly adjusting the sending rates and cut back the rates upon imminent congestion to reduce the impact on latency. Unfortunately, because ECN marks and RTT measurements need a few round-trips to take effect, the schemes are slow to improve latency of the applications predominantly short flows (e.g., each flow lasts only a handful of round-trips). At the same time, the schemes also incur throughput loss due to overshooting and undershooting of the sending rates during the adjustment. Therefore, improvements are needed in the field.

SUMMARY

The present disclosure provides receiver-directed apportioning by adding a bandwidth share indicator value to the acknowledgement messages sent by the receiver to the senders. In certain embodiments, bandwidth share indicator value comprises the number of senders seen by the receiver. In other embodiments, the bandwidth share indicator value may comprise a percentage bandwidth share allocated to the sender computer to allow for varying priorities between senders. In the acknowledgement message, each sender may also include the incast degree, which is programmed in the application, to the receiver. This strategy enables the receiver to send back the sender count to all the senders as soon as the first sender's packets arrive, even before the rest of the senders' packets arrive. Thus, the sender count and the incast degree look-ahead enable the receiver-directed system to achieve accurate and faster convergence of sending rates, without any repeated adjustments.

According to one aspect, a method of managing congestion in a computer network is provided, comprising maintaining a set of active senders in a network interface of a receiver computer in the computer network, receiving a message from a sender computer in the network, and providing an acknowledgement message to the sender computer, the acknowledgement message including a bandwidth share indicator value for the sender computer, the bandwidth share indicator based on the set of active senders.

According to another aspect, a computer server is provided, comprising a network interface card having a network interface memory. The network interface card is configured to maintain a set of active senders in the network interface card, receive a message from a sender computer in the network, and provide an acknowledgement message to the sender computer, the acknowledgement message including a bandwidth share indicator value for the sender computer, the bandwidth share indicator based on the set of active senders.

According to another aspect, a computer server is provided, comprising a network interface card having a network interface memory, the network interface card configured to send a message to a receiver computer over a computer network, receive an acknowledgement message from the receiver computer, the acknowledgement message including a bandwidth share indicator value for the computer server, the bandwidth share indicator based on the set of active senders, and set a message transmission rate from the computer server to the receiver computer based on the bandwidth share indicator value.

According to another aspect, network interface card is provided, comprising a computer processor and a network interface memory communicatively connected to the computer processor, wherein the computer processor is configured to maintain a set of active senders in the network interface card, receive a message from a sender computer in the network and provide an acknowledgement message to the sender computer, the acknowledgement message including a bandwidth share indicator value for the sender computer, the bandwidth share indicator based on the set of active senders.

According to another aspect, a network interface card is provided, comprising a computer processor an a network interface memory communicatively connected to the computer processor, wherein the computer processor is configured to send a message to a receiver computer over a computer network, receive an acknowledgement message from the receiver computer, the acknowledgement message including a bandwidth share indicator value for the computer server, the bandwidth share indicator based on the set of active senders, and set a message transmission rate from the computer server to the receiver computer based on the bandwidth share indicator value.

BRIEF DESCRIPTION OF THE DRAWINGS

In the following description and drawings, identical reference numerals have been used, where possible, to designate identical features that are common to the drawings.

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Figure 1:
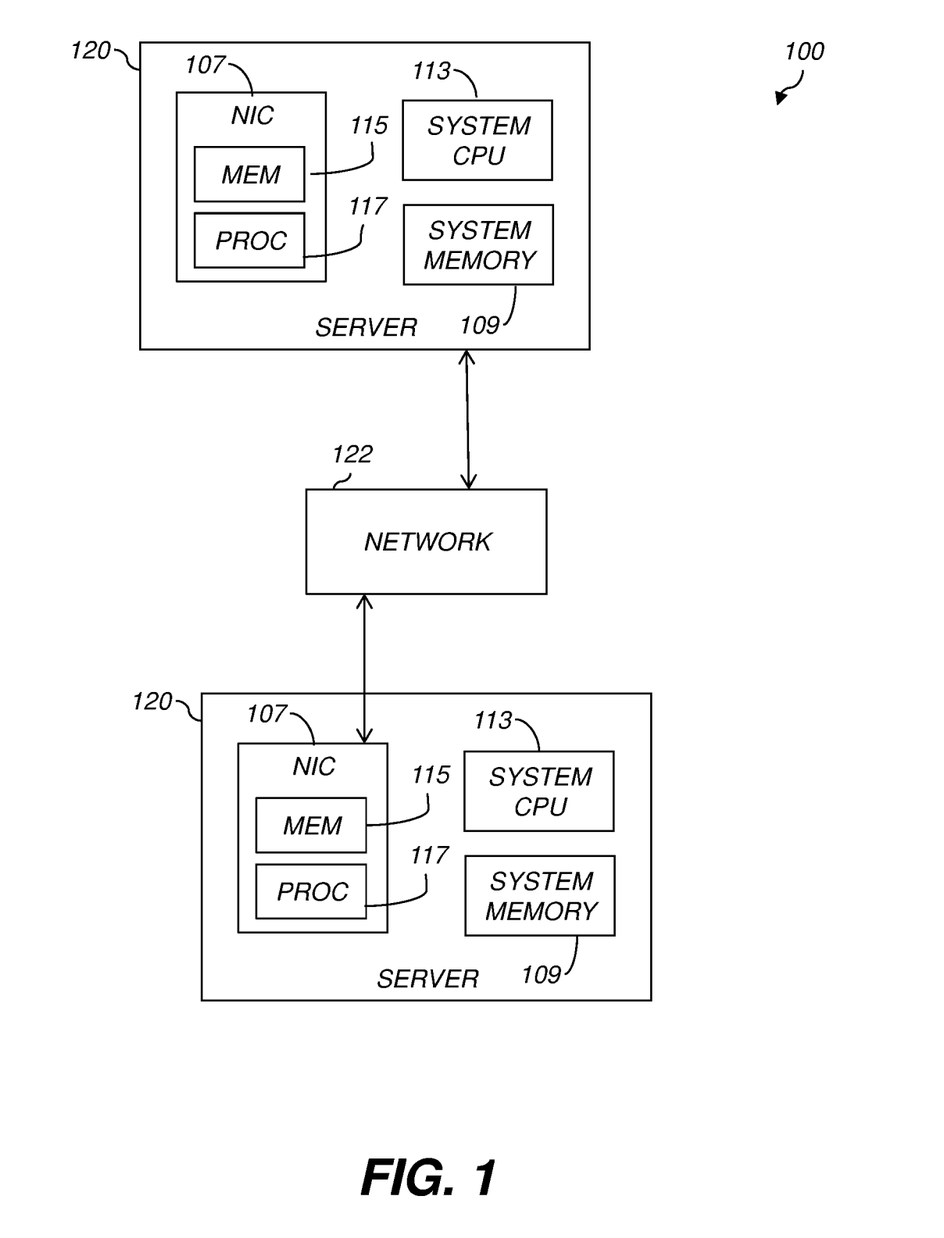
FIG. 1 is a diagram illustrating a plurality of computer servers connected by a network in a data center according to various aspects.

FIG. 1 shows a data center 100 having a plurality of computer servers 120 connected by a network 122 according to one embodiment. Although only two servers 120 are shown in FIG. 1, the data center 100 may have many more servers 120. The network 122 may be configured to support Infiniband or RoCE (RDMA over converged Ethernet) for sending and receiving messages between the servers 120. As shown, the computer servers may include a network interface card (NIC) 107, a system central processing unit (CPU) 113, and a system memory 109. The NIC 107 may also comprise a network interface memory 115 and a processing unit 117.

The servers 120 are configured such that when a receiver server 120 receives a message from a sender server 120 over the network 122, the receiver replies to the sender with an acknowledgement message (ACK). As part of the acknowledgement message, the receiver includes a value representing a bandwidth share indicator value for the sender server 120. In certain embodiments, the bandwidth share indicator value comprises a value n representing the number of current senders. Once it receives the ACK message with the n value, the sender sets its send rate to be 1/n. In this way, the rate of messages received by the receiver from all senders will be reduced to the line rate, thereby alleviating congestion at that receiver. In other embodiments, the bandwidth share indicator value may comprise other values, such as a percentage bandwidth share that is being allocated to the sender server 120. For example, certain senders may be allocated a higher or lower bandwidth share depending on assigned priorities. As used herein, the term "line rate" shall be interpreted to mean the maximum rate at which a network interface card 107 in a receiver computer is able to process incoming messages.

In certain embodiments, the bandwidth share indicator value may be implemented as a hardware circuit (e.g., a latch) in the NIC 107 separate from the network interface memory 115. In other embodiments, the bandwidth share indicator value is maintained within the network interface memory 115 of the NIC 107. Also, the congestion control methodology described herein may be implemented by software running on the NIC 107 processor 117 and memory 115 or may be implemented by a dedicated hardware circuit within the NIC 107. Further, the congestion control methodology described herein may be implemented by software running on the server 120 system processor 113 and system memory 109.

Figure 2A:
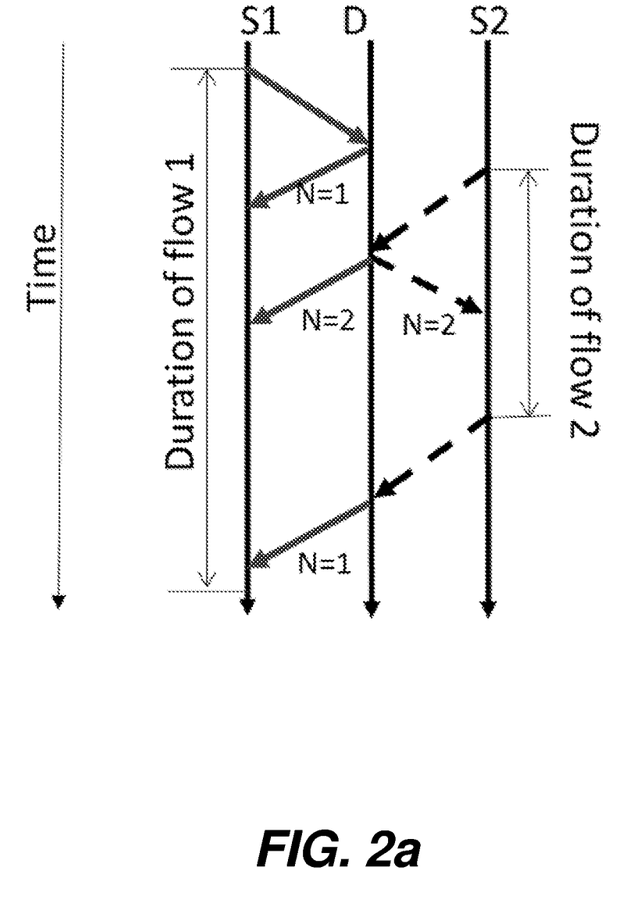
FIG. 2*a* is a timing diagram illustrating a single receiver (D) receiving messages from two senders (S1 and S2) and the corresponding bandwidth share indicator messages according to various aspects.
Figure 2B:
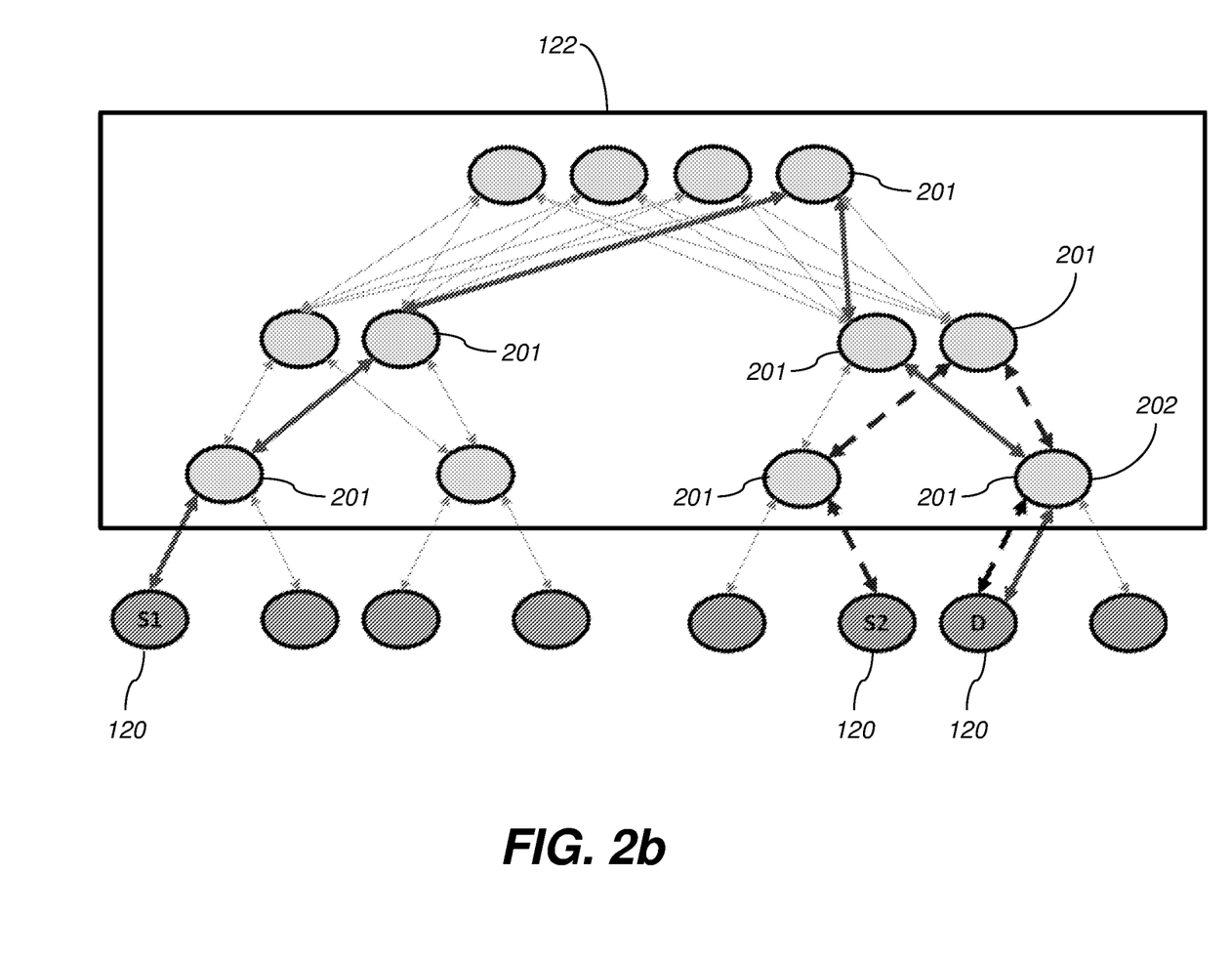
FIG. 2*b* is a routing diagram illustrating the single receiver (D) receiving messages from two senders (S1 and S2) and the corresponding bandwidth share indicator messages according to various aspects.

FIGS. 2*a* and 2*b* illustrate one example where the computer servers 120 are configured such that a single receiver (D in FIGS. 2*a* and 2*b*, which may be one of servers 120) is receiving a steady long flow from one sender (S1, which may be another one of servers 120) at a line rate. The sender S1 continues to transmit at the line rate without throttling as it sees the n value (which represents the number of current senders) remain at 1 in the ACKs from the receiver D. When a second sender (S2, which may also be one of the servers 120) initiates another long flow to the same receiver D, there is contention at the leaf-level switch 202 (which is one of many network switches 201 in the network 122), as shown in FIG. 2(b), where the solid and broken lines show the two flows. As messages from each of the two flows arrive at the destination receiver server D in an interleaved fashion, the NIC 107 in the receiver D includes the updated n=2 value with the ACKs to each sender (S1 and S2). The ACKs cause the sender NICs to throttle their transmission rate to 1/n (in the case of 2 senders, the rate would be reduced to ½ of the line rate), which can be sustained in steady state. The system 100 thereby provides two key benefits. First, the continuous feedback mechanism means that congestion control feedback to senders is fast. Second, the senders are given an accurate and precise rate not to exceed. The disclosed process seamlessly handles flow "churn" by constantly or periodically sending updated bandwidth share indicator values.

The example in FIGS. 2a and 2b are for one simplified example in which the senders S1 and S2 have equal priority which results in an equal bandwidth share. More generally, the NIC 107 sends a value that indicates the share of bandwidth that each sender may use. For example, if sender S1 was to be given twice as much bandwidth as sender S2 because S1 has higher priority than S2, then the receiver D would do a weighted count and would communicate the number 3 instead of 2. The receivers would then divide their local priority (2 for S1 and 1 for S2) to arrive at their bandwidth fractions of ⅔ and ⅓ respectively.

In general, the receiver D can compute a function of recent sender history and send that resulting value to the senders in the acknowledgement messages. Senders, in turn may use another function to deduce bandwidth share from that value. For simplicity, the illustrated examples assume that the receiver-side function is the sender-count and the sender side function is the line rate divided by the sender count.

In the preferred method, the functions in [0027] above ensure that the sum of bandwidth sent to all senders matches the receiver's line rate. (If the sum exceeds line rate, there may be network congestion. Similarly, if the sum falls short of the line rate, network bandwidth goes underutilized.)

Figure 3A:
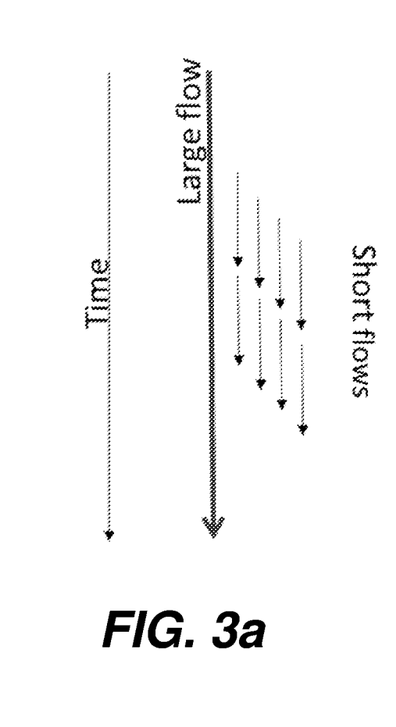
FIG. 3*a* is a graph showing the interaction of long and short flows according to various aspects.
Figure 3B:
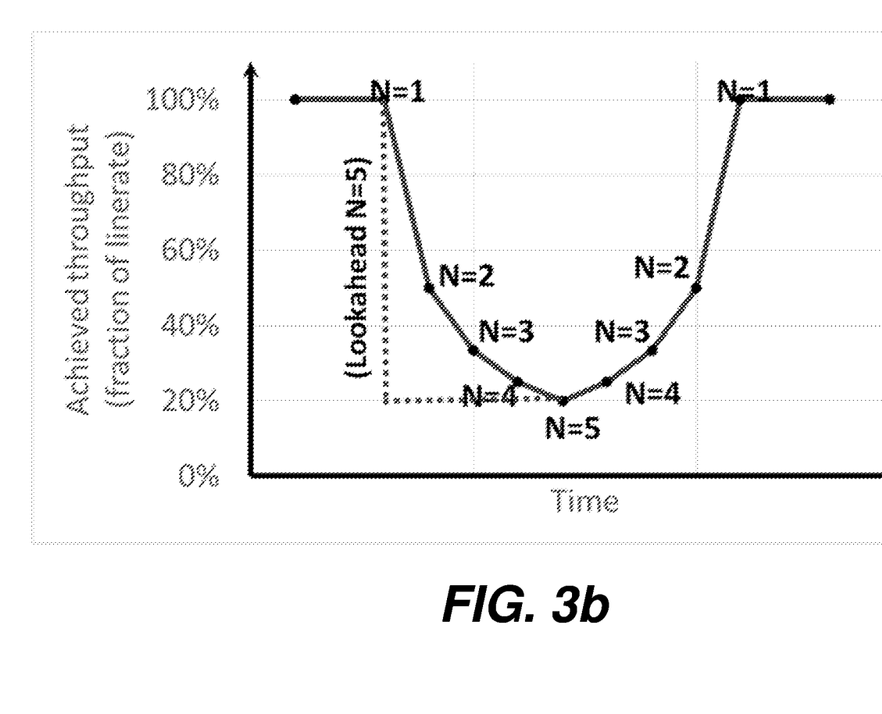
FIG. 3*b* is a graph showing throughput vs. time for long flow throttling.

For short flows interacting with long flows, the system 100 may implement the same mechanism to ensure that the latency of short-flows is not hurt. FIG. 3(a) illustrates the interaction of long and short flows according to one embodiment. A long flow that contends with k other short flows is directed to reduce its sending rate to 1/(k+1) because the total number of senders is n=k+1. While this throttling helps the short flows' latency, such throttling is short-lived and does not hurt the long flow's throughput. The presence of short flows can be treated as a case of flow-churn; the long flows throttle their rates according to the number of short flows, but only for the duration of the short flows, as shown in FIG. 3(b).

The disclosed system 100 addresses one other challenge of short flows: accurate counting of flows. Consider a case where two incasts to the same destination (say D) begin close in time and there is an overlap in the senders of the two incasts (sender S is part of both incast groups). Because S's two incast flows would be serialized at S's NIC, D's NIC should count S exactly once when determining n. If the disclosed system counts each flow as a sender, the two flows from S would artificially bloat n resulting in lost throughput. Consider another case where two short flows use one persistent connection but there are no flow begin/end markers. Then, this single connection would be assumed to be active for the entire duration of the two real short flows (including any timegap between messages). Such an assumption would lead to overcounting of flows in the idle period between flows, resulting in throughput loss. To address the first case, in certain embodiments the disclosed system 100 maintains a list of the senders having at least one active message flow, referred to herein as the active flow set (AFS).

Figure 4A:
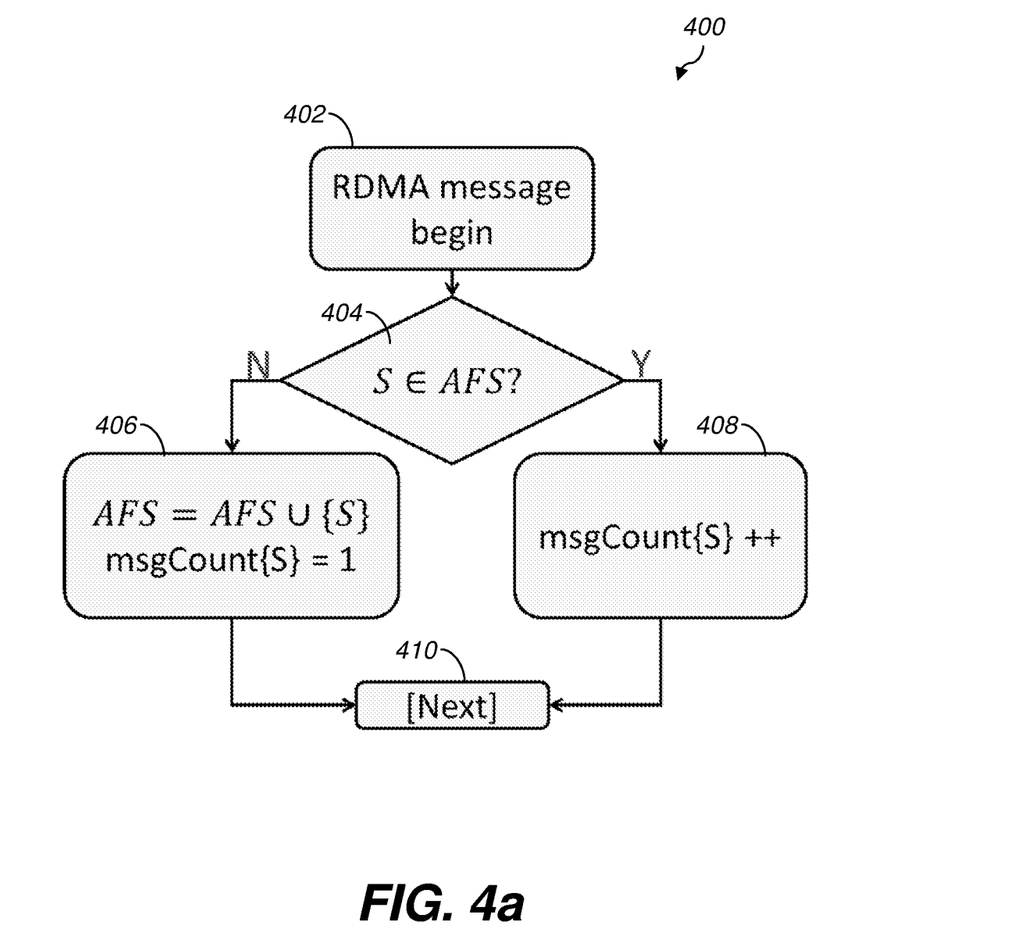
FIG. 4*a* is a flowchart illustrating a process for congestion control according to one embodiment.
Figure 4B:
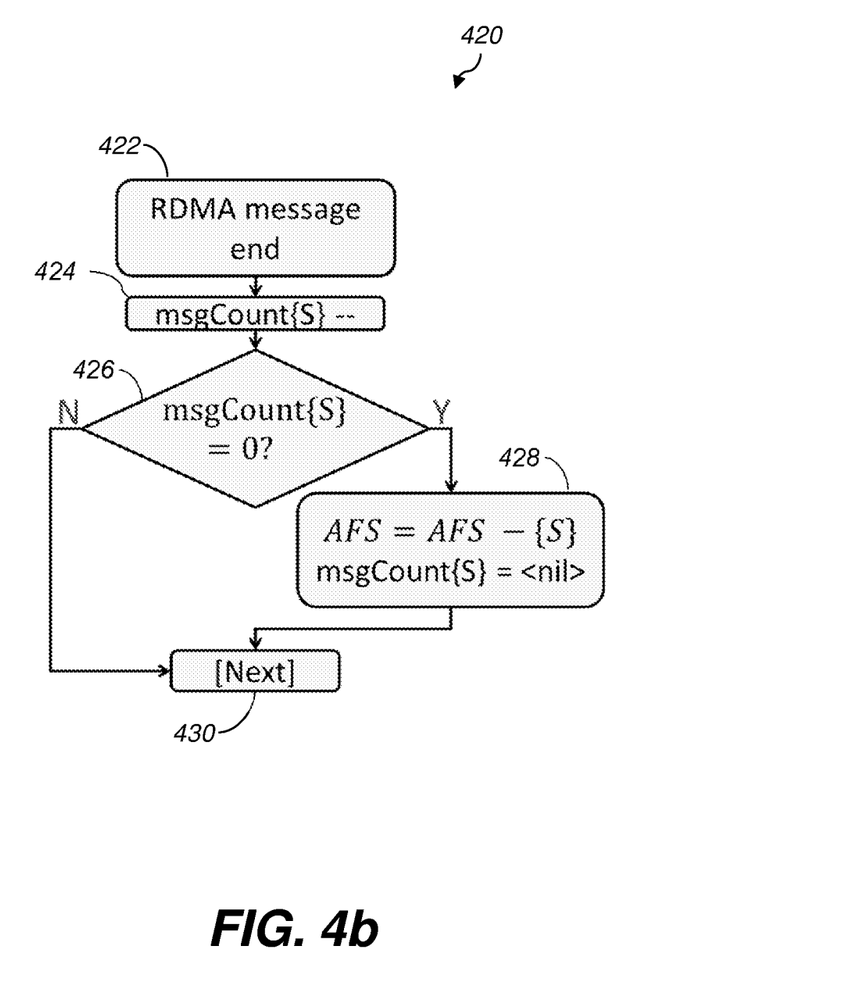
FIG. 4*b* is a flowchart illustrating a process for congestion control according to one embodiment.

The flowchart in FIG. 4a describes a process 400 for AFS tracking operation for messages from sender S (which may be one of the servers 120) according to one embodiment. Upon receiving a new message (e.g., begin of a new message), the NIC 107 determines if the sender of the message is already present in the AFS (stage 404, FIG. 4a). If not, the sender of the message is added to the AFS and a message count associated with that sender is initialized to 1 (stage 406). If the sender associated with the received message is already in the AFS, the message count associated with that sender is incremented (stage 408), and the system is ready to process the next message (stage 410). The flowchart of FIG. 4b shows a similar process 420 for processing messages when the message is completed (e.g., a message end marker is received). After a message end marker has been received (stage 422), the message count associated with the sender is decremented (stage 424). The system then determines whether the message count associated with the sender is equal to 0 (stage 426). If not, the system is ready to process the next message (stage 430). When multiple short messages from the same sender are concurrently active, the system decrements the sender count for the AFS only when all the messages from that sender terminate (stage 428), as shown in FIG. 4(b). With the above tracking in place, the disclosed receiver-directed rate control system 100 can use the number of elements in the AFS as the n value (i.e., n=|AFS|), which is transmitted by the receiver to the sender by the NIC 107 as part of the ACK message.

In certain embodiments, the system 100 may provide a look-ahead notification of an upcoming set of incast flows that are part of an incast group. For example, if each incast message carries (1) information that it is part of a 20-flow incast and (2) the list of the 20 senders, the receiver NIC can advertise rate limits that incorporate 20 senders even before all 20 senders' messages arrive at the receiver. In other words, the AFS can be populated with the set of senders in advance of actual message arrival. This results in faster backoff on the part of the long flows as shown by the dotted line in FIG. 3(b). For accurate counting, the system may treat any flow as if it begins when the lookahead notification first arrives. The ending of flows may be handled similarly as in the case of FIG. 4 without the lookahead.

Since in-network congestion (as opposed to end-point congestion) is not visible at the NIC, the disclosed system may utilize DCQCN which uses ECN marks to achieve congestion control for in-network congestion. However, because the NIC cannot distinguish between the ECN marks due to in-network congestion and the ECN marks at the last-hop switch due to end-point contention (even end-point contention results in ECN marks), additional handling is implemented by the disclosed system to account for this ambiguity. Without any additional safeguards, the ECN-based congestion control mechanisms may overthrottle the sending rates even if the congestion is limited to the end-points. To avoid such overthrottling, the disclosed system may include a test to distinguish between in-network congestion and end-point congestion. If the incoming datarate at the receiver's NIC is below the line rate, the sytsem infers that the ECN marks are for in-network contention and includes them in the ACKs. However, if the incoming traffic is at the line rate, but the packets are ECN-marked, the system infers that end-point contention is responsible, in which case the system will include the n values without any ECN mark on the returning ACKs to the sender.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method of managing congestion in a computer network, comprising:
   maintaining, by a receiver computer, a set of active senders in a network interface or system memory of a receiver computer in the computer network, the active senders configured to communicate with the receiver computer according to a Remote Direct Memory Access (RDMA) protocol;
   receiving, by the receiver computer, a message from a sender computer in the network;
   providing, by the receiver computer, an acknowledgement message to the sender computer, the acknowledgement message including a bandwidth share indicator value for the sender computer, the bandwidth share indicator based on the set of active senders; and
   in response to receipt of the acknowledgement message:
      determining, by the sender computer, based on the bandwidth share indicator value, a message transmission rate for RDMA communication between the sender computer and the receiver computer, and
      adjusting, by the sender computer, based on the message transmission rate, a rate at which messages are sent by the sender computer in a flow between the sender computer and the receiver computer established according the RDMA protocol.

2. The method of claim 1, wherein the bandwidth share indicator value included in the acknowledgement is a sender count equal to the set of active senders and the message transmission rate is set to a value equal to a line rate of the receiver computer divided by the sender count value.

3. The method of claim 1, wherein the bandwidth share indicator includes the output value of a function that uses the set of active senders seen at the receiver as one of its parameters.

4. The method of claim 3, wherein the transmission rate determined by the sender, is a value being a second function of said bandwidth share indicator value.

5. The method of claim 4, wherein the sum of the transmission rates of all senders sums to a line rate of the receiver.

6. The method of claim 4, further comprising:
   removing the sender computer identifier from the active sender set and decrementing the sender count if the message count associated with the sender computer becomes zero.

7. The method of claim 3, further comprising:
   setting the sender count to be equal to the number of sender computer identifiers in the active sender set.

8. The method of claim 3, further comprising:
   setting the bandwidth share indicator value to be an output of a function of the active sender set.

9. The method of claim 1, further comprising:
   adding a sender identifier for the sender computer to the active sender set; and
   incrementing a message count associated with the sender computer.

10. The method of claim 1, wherein the message received from the sender computer includes information representing the number of sender computers in an incast group, the computer server configured to add the number of computers in the incast group to the active sender set in response to receipt of the message.

11. The method of claim 1, wherein the sender computer and the receiver computer comprise computer servers in a data center.

12. The method of claim 1, further comprising:
   transmitting, by the sender computer, a second message at the adjusted message transmission rate.

13. A computer server, comprising:
   a network interface card having a network interface processor and a network interface memory, the network interface card or a system memory of the computer server configured to:
   maintain a set of active senders, the active senders configured to communicate messages according to a Remote Direct Memory Access (RDMA) protocol, the network interface card further configured to:
   receive a message from a sender computer in the network, the message including information representing the number of sender computers in an incast group
   adjust, in response to receipt of the message, the active sender set to include the number of computers in the incast group before communicating with another sender in the incast group; and
   generate an acknowledgement message comprising a bandwidth share indicator value based on a set of active senders, the sender computer configured to adjust a message transmission rate based on the bandwidth share indicator value in response to receipt of the acknowledgment message; and
   provide an acknowledgement message to the sender computer to cause the sender computer to adjust the message transmission rate based on the bandwidth share indicator value for the sender computer.

14. The computer server of claim 13, wherein said maintain a set of active senders is performed by a dedicated hardware circuit located in the NIC.

15. The computer server of claim 13, wherein said maintain a set of active senders is performed by the network interface processor and network interface memory.

16. The computer server of claim 13, wherein the NIC or the system memory of the computer server is further configured to:
   add a sender identifier for the sender computer to the active sender set; and
   increment a message count associated with the sender computer.

17. The computer server of claim 16, wherein the NIC or the system memory of the computer server is further configured to:
set the sender count to be equal to the number of sender computer identifiers in the active sender set.

18. The computer server of claim 17, wherein the NIC or the system memory of the computer server is further configured to:
remove the sender computer identifier from the active sender set and decrement the sender count if the message count associated with the sender computer becomes zero.

19. A computer server, comprising:
a network interface card having a network interface processor and a network interface memory, the network interface card configured to:
send a message to a receiver computer over a computer network; and
receive an acknowledgement message from the receiver computer, the acknowledgement message including a bandwidth share indicator value generated by the receiver computer, the bandwidth share indicator based on a set of active senders configured to communicate messages according to a Remote Direct Memory Access (RDMA) protocol;
in response to receipt of the acknowledgement message, a message transmission rate for a RDMA data flow from the computer server to the receiver computer based on the bandwidth share indicator value; and
transmit data for the RDMA data flow at the set message transmission rate.

20. The computer server of claim 19, wherein said set a message transmission rate from the computer server to the receiver computer based on the bandwidth share indicator value is performed by a dedicated hardware circuit located in the NIC.

21. The computer server of claim 19, wherein said set a message transmission rate from the computer server to the receiver computer based on the bandwidth share indicator value is performed by the network interface processor and network interface memory.

22. The computer server of claim 19, wherein said setting of the message transmission rate comprises setting said transmission rate to a value equal to a line rate of the computer server divided by a sender count value.

23. The computer server of claim 19, wherein the bandwidth share indicator value included in the acknowledgement comprises the output value of a function of the set of active senders seen at the receiver.

24. The computer server of claim 19, wherein the message includes information representing the number of sender computers in an incast group.

* * * * *